US009779182B2

(12) United States Patent
Novosel et al.

(10) Patent No.: US 9,779,182 B2
(45) Date of Patent: Oct. 3, 2017

(54) SEMANTIC GROUPING IN SEARCH

(71) Applicant: Microsoft Corporation, Redmond, WA (US)

(72) Inventors: Vedrana Novosel, Seattle, WA (US); Nicholas Robinson, Sammamish, WA (US); Evan Malahy, Redmond, WA (US); Zachary Gutt, Seattle, WA (US); Ronald Morris, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 575 days.

(21) Appl. No.: 14/297,307

(22) Filed: Jun. 5, 2014

(65) Prior Publication Data

US 2014/0365481 A1 Dec. 11, 2014

Related U.S. Application Data

(60) Provisional application No. 61/832,686, filed on Jun. 7, 2013.

(51) Int. Cl.
 *G06F 17/30* (2006.01)
(52) U.S. Cl.
 CPC .. *G06F 17/30994* (2013.01); *G06F 17/30864* (2013.01)
(58) Field of Classification Search
 CPC .............. G06F 17/30994; G06F 17/30864
 See application file for complete search history.

(56) References Cited

U.S. PATENT DOCUMENTS

| | | | |
|---|---|---|---|
| 8,326,842 B2 | 12/2012 | Vadlamani et al. | |
| 2003/0037050 A1* | 2/2003 | Monteverde | G06F 17/30864 |
| 2003/0200531 A1* | 10/2003 | Fairweather | G06F 8/427 |
| | | | 717/114 |
| 2003/0233345 A1* | 12/2003 | Perisic | G06F 17/30867 |
| 2005/0055341 A1* | 3/2005 | Haahr | G06F 17/30648 |
| 2007/0162465 A1* | 7/2007 | Cope | G06F 17/2247 |
| 2008/0059454 A1* | 3/2008 | Andrieu | G06F 17/30864 |
| 2008/0140603 A1* | 6/2008 | Babikov | G06F 17/30864 |
| | | | 706/59 |
| 2008/0147725 A1* | 6/2008 | Jung | G06F 8/38 |
| 2008/0155426 A1* | 6/2008 | Robertson | G06F 17/30864 |
| | | | 715/738 |

(Continued)

OTHER PUBLICATIONS

Hindle, et al.,"Clustering Web Video Search Results based on Integration of Multiple Features", In Proceedings of the Journal of World Wide Web vol. 14 Issue 1, Jan. 2011, 19 pages.

(Continued)

*Primary Examiner* — Noosha Arjomandi
(74) *Attorney, Agent, or Firm* — Vierra Magen Marcus LLP

(57) ABSTRACT

A system and method are disclosed for intelligent grouping and presentation of search results. In embodiments, the present technology groups results into relevant categories, and presents the categorized results on a single screen or small set of screens. The most relevant results for each category may be displayed in graphical tiles that a user may select to view more details on the search results. Alternatively, a user may select, or pivot on, a category heading to get more results for a given category.

22 Claims, 13 Drawing Sheets

(56) References Cited

U.S. PATENT DOCUMENTS

| | | | | |
|---|---|---|---|---|
| 2010/0211603 | A1* | 8/2010 | Bealing | G06F 17/30312 707/776 |
| 2010/0268596 | A1* | 10/2010 | Wissner | G06F 17/30864 705/14.49 |
| 2010/0268702 | A1* | 10/2010 | Wissner | G06F 17/30705 707/711 |
| 2011/0119298 | A1* | 5/2011 | Arrasvuori | G06F 17/30867 707/769 |
| 2011/0208822 | A1* | 8/2011 | Rathod | G06Q 30/02 709/206 |
| 2011/0282872 | A1* | 11/2011 | Oksman | G06F 17/30675 707/727 |
| 2014/0129942 | A1* | 5/2014 | Rathod | H04N 21/44222 715/720 |
| 2014/0258002 | A1* | 9/2014 | Zimmerman | G06Q 30/0256 705/14.72 |
| 2014/0365481 | A1* | 12/2014 | Novosel | G06F 17/30864 707/728 |
| 2014/0365496 | A1* | 12/2014 | Chung | G06F 9/4443 707/740 |
| 2015/0032727 | A1* | 1/2015 | Chung | G06Q 30/0251 707/722 |

OTHER PUBLICATIONS

Paulovich, et al.,"PEx-Web: Content-Based Visualization of Web Search Results", In Proceedings of 12th International Conference Information Visualisation, Jul. 9, 2008, 7 pages.

Hemayati, et al.,"Semantic-Based Grouping of Search Engine Results", Published on: Jun. 2007, Available at: http://iconceptpress.com/download/paper/100621155857.pdf.

Aviram, Amittai,"Grouping Web Search Results by Semantic Likeness", Published on: May 25, 2007, Available at: http://www.gersteinlab.org/courses/545/07-spr/proj/proj_rpt.Amittai.pdf.

"Semantic Keyword Grouping—Improving Quality Score with Relevance", Published on: Mar. 10, 2013, Available at: http://www.wordstream.com/keyword-grouping-semantic.

Heim, et al.,"Faceted Visual Exploration of Semantic Data", In Proceedings of the Second IFIP WG 13.7 Conference on Human-computer Interaction and Visualization, Jun. 10, 2013, 18 pages.

* cited by examiner

Fig. 2

Search Query

Search Results:

| Category 1 ## | Category 2 ## | Category 3 ## | Category 4 ## |
|---|---|---|---|
| Tile 1A | Tile 2A | Tile 3 | Tile 4A / Tile 4B |
| | Tile 2B | | Tile 4C / Tile 4D |
| Tile 1B | Tile 2C | | Tile 4E / Tile 4F |

Fig. 3

Search Query

Search Results:

| Category 1 | Category 2 | Category 3 |
|---|---|---|
| Tile 1A | Tile 2A | Tile 3A |
| | Tile 2B | Tile 3B |
| Tile 1B | Tile 2C / Tile 2D | Tile 3C |

*Fig. 4*

| Search Query |
|---|

Search Results:

| Category 1 | | | Category 2 | | |
|---|---|---|---|---|---|
| Tile 1A | | | Tile 2A | | |
| Tile 1B | | Tile 1D | Tile 1E | | |
| | | | | Tile 1F | Tile 1G |
| | Tile 1C | | | | |
| | | | Tile 2B | | |
| | | | Tile 2C | | |

Search Results: [Catman]

Movies 41
- Catman II — 112
- Catman – the Beginning — 112

Television 15
- Catman — 112
- Catman and Wonderbird — 112
- The Catman Story — 112

Comics 10
- The Catman Chronicles — 112

Popular 8
- Catman Lives Again — 112
- Catman III — 112
- The Catman Album — 112

More Like
- Catgirl
- Felix the Super Cat
- Dogman

*Fig. 11*

Catman Movies

| Suspensful 25 | Funny 10 | Scary 6 | More Like |
|---|---|---|---|
| Catman II | Catman – The Beginning | Ghost of Catman | • Television • Comics • Popular |
| | Bill Blake – Star of Catman | Catman and the Mummy | |
| The Making of Catman II | The Funny Side of Catman / Catman Fights | Catman Rises | |

114, 112, 100

SEMANTIC GROUPING IN SEARCH

PRIORITY CLAIM

This application claims priority to U.S. Provisional Patent Application No. 61/832,686 filed Jun. 7, 2013, entitled, "Semantic Grouping in Search," which is incorporated herein by reference in its entirety.

BACKGROUND

On other platforms and websites, search and browse results are presented as long lists, with only the top results visible and scrolling or paging required to see more. This approach doesn't convey the makeup of the full set of results. It also doesn't guide users to narrow down results by interacting with the results themselves rather than separate mechanisms. Large results sets can also feel unorganized and overwhelming

SUMMARY

The present technology in general relates to a system for intelligent grouping and presentation of search results. In embodiments, the present technology displays search results on a single screen, organized into categories. The most relevant results for each category may be presented in graphical tiles under each category heading. A user may select one of the displayed graphical tiles under a category to receive detailed information on that search result. Alternatively, a user may select or "pivot on," a category heading. In this instance, additional search results for the category may be displayed to the user. As in the high-level category screen, these additional search results may be sorted into and displayed in subcategories, with the most relevant search results in each subcategory displayed in graphical tiles to the user.

The size of the category/subcategory columns may indicate relevance of the categories/subcategories in relation to each other. Moreover, the size of the tiles within a category may indicate the relevance of the exemplars in relation to each other.

In one example, the present technology relates to a method of presenting search results for a search query, comprising: (a) organizing the search results into two or more categories, the search results organized into the two or more categories based on a semantic relation between the search results and the two or more categories; and (b) displaying the two or more categories, and at least one exemplar search result under a category of the two or more categories, on a single screen.

In a further example, the present technology relates to a method of presenting search results for a search query, comprising: (a) organizing the search results into two or more categories, and two or more subcategories under a first category of the two or more categories, the search results organized into the two or more categories based on a semantic relation between the search results and the two or more categories, and search results organized into the two or more subcategories based on a semantic relation between the search results and the two or more subcategories; (b) displaying the two or more categories, and at least one exemplar search result under a category of the two or more categories, on a first screen; (c) receiving selection of the first category of the two or more categories; and (d) displaying the two or more subcategories of the first category, and at least one exemplar search result under a subcategory of the two or more categories, on a second screen replacing the first screen.

In another example, the present technology relates to a computer computer-readable medium for programming a processor to perform a method of presenting search results for a search query, comprising: (a) organizing the search results into first and second categories, the search results organized into the first and second categories based on a semantic relation between the search results and the two or more categories; and (b) displaying the first and second categories, displaying a first exemplar tile for a search result under the first category, and displaying a second exemplar tile for a search result under the second category, the first and second categories and first and second exemplar tiles displayed on a single screen, a dimension of the first displayed category sized relative to a like dimension of the second displayed category to indicate a relevance of the first category to the search query relative to a relevance of the second category to the search query.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

FIGS. 2-5 illustrate different examples of user interfaces including categorized search results according to embodiments of the present technology.

FIGS. 9-11 illustrate further examples of user interfaces including categorized search results according to embodiments of the present technology.

DETAILED DESCRIPTION

The present technology will now be explained with reference to the figures, which in general relate to a system and method for intelligent grouping and presentation of search results. In embodiments, the present technology groups results into relevant categories, and presents the categorized results on a single screen or small set of screens. A cloud service may dynamically categorize the results, with categories chosen depending on the makeup of results. Categories are presented with selectable, i.e., clickable, titles that act as filters on the current search. The top search results from each category, referred to herein as exemplars, may be presented as selectable tiles beneath each category heading. The size of the category columns may indicate relevance of the categories in relation to each other. Moreover, the size of the exemplar tiles within a category may indicate the relevance of the exemplars in relation to each other.

A system as described herein presents advantages for both visual and voice interaction with the results. Visually, the categories containing the results may all be presented on a single screen, from which a user may drill down into subcategories. The search results may also be navigated using voice commands. For speech interaction with the results, a user may drill down into a category by speaking category titles rather than repeatedly scrolling. Categories also educate users about what they can say (e.g. user sees an actor group and then filters by a different actor).

Figure 1:
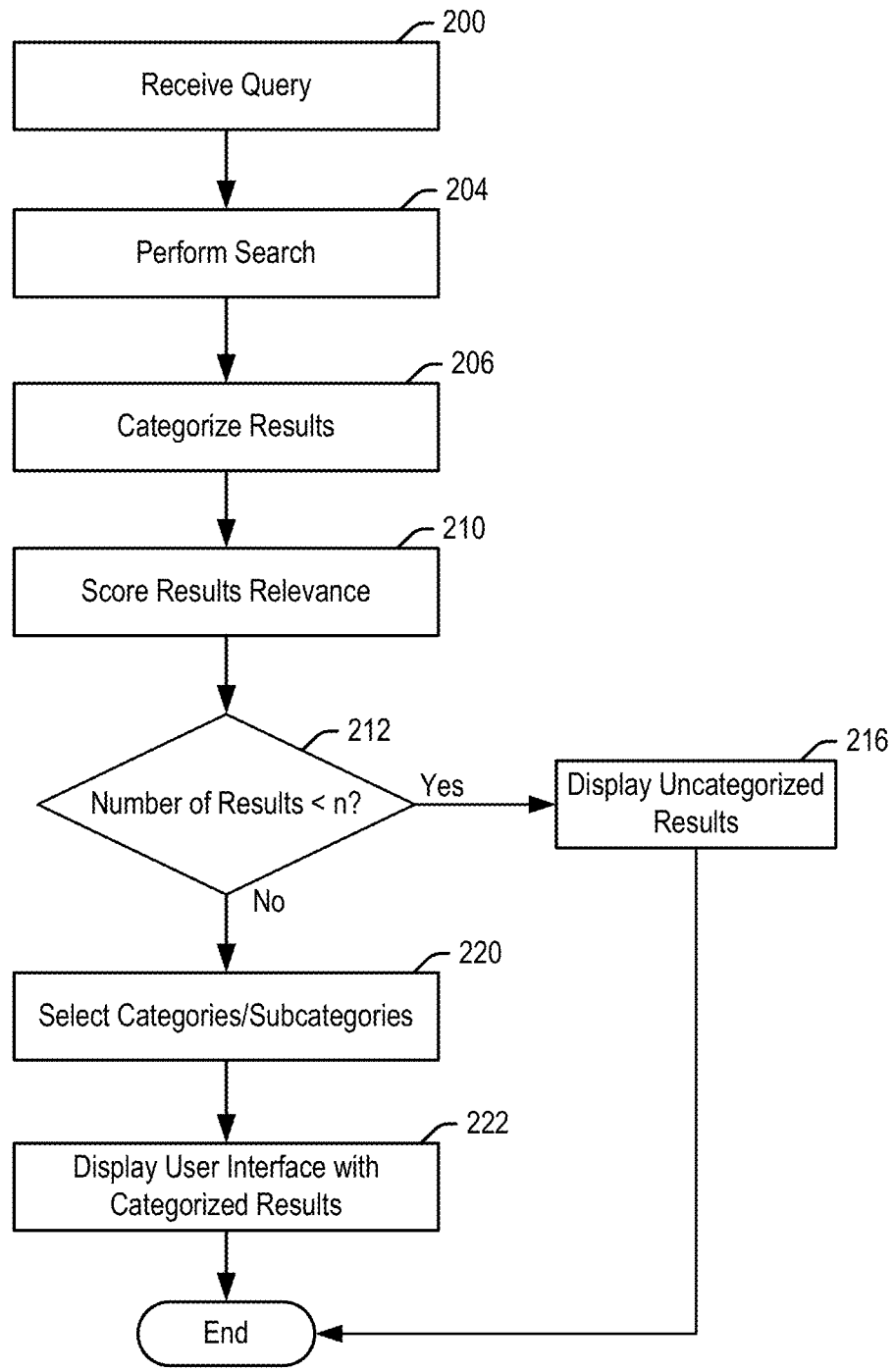
FIG. 1 is a flowchart illustrating the operation of the present technology to present a user interface including categorized search results.

FIG. 1 is a flowchart illustrating an example of sorting search results into categories, also referred to herein as buckets, based on their semantic relevance to the search query and categories. FIG. 2 illustrates an example of such a user interface 100 including search results organized according to embodiments of the present technology. In step 200, a search engine may receive a search query 102 (entered by a user either on user interface 100 or a different user interface). The search engine performs the search in step 204 as explained below, and the results for the search query 102 may be obtained and organized into a number of categories (or buckets) in step 206. As explained below, in embodiments, the number and type of categories may dynamically change for each search query, depending on the search results obtained and which categories the search results fall into. In further embodiments, categories may be predefined, and displayed if they contain search results for a given search query.

The subject matter of the respective categories may vary greatly in embodiments. In a non-limiting example, the categories may include movies, television, games, music, popular subject matter, current events, celebrities, geography, history, science, shopping, hobbies, painting, sculpture, literature, recreation, sports, athletes, travel, transportation, business, finance, politics, computers, websites, phones, education, babies, toddlers, kids, law, health, nutrition, food, recipes, restaurants, fashion, real estate, home furnishing, garden, cars, holidays, and religion. A subset of these may be displayed for each search result, based on the search results obtained and/or based on a pre-definition of categories. As noted, these categories are presented by way of example only, and there may be additional or alternative categories in further embodiments. A group of two or more subcategories may be defined for each of the above-identified categories. The example of FIG. 2 includes four categories numbered 1-4. It is understood there may be fewer or greater than four categories in further embodiments.

Where search results are classified into a given category (by schemes explained below), the most relevant search result(s) may be displayed as one or more exemplars under the category heading. An exemplar may be a graphical tile including an image, graphics and/or text presenting information on the represented search result. Users may select an exemplar tile to find out more about the represented search result.

In the example of FIG. 2, there are two exemplar tiles 1A and 1B under the first category 1. The search may have identified more search results for category 1. However, in embodiments, those search results having a quantifiable relevance greater than a predetermined threshold are displayed as exemplar tiles. Schemes for determining the quantifiable relevance are explained hereinafter. The predetermined threshold and the number of exemplar tiles for the respective categories may vary in different embodiments.

Where a user wishes to see more search results for a given category than the top level exemplar tiles, the user may select, or "pivot on," the category heading. Upon pivoting on a category heading, a new user interface may be displayed including a list of subcategories for the selected category, and exemplar tiles under each subcategory representing the most relevant search results for the respective subcategories. Examples of a subcategory user interface upon pivoting on a category are explained in greater detail below. A user may in turn pivot on a subcategory heading which then provides additional subcategories (sub-subcategories) for the selected subcategory. It is understood that several levels of subcategories may be provided for a given search query, especially where the search query returns a large number of results.

In accordance with an aspect of the present technology, not only are the top results for a given category displayed as exemplar tiles, but the size of an exemplar tile relative to other tiles in the category may indicate the relevance of that search result to the query in comparison to other search results in that category. This is referred to as in-bucket relevance. The exemplar tile 1A representing a first search result in category 1 is larger than the exemplar tile 1B representing a second search result. This may indicate that the first search result is more relevant to the search query than the second search result.

In embodiments, the relative sizes of the tiles in a given category may be directly proportional to the relative relevance of the respective search results. Thus, as the tile 1A is roughly twice the size of the tile 1B, this may mean that the result represented by tile 1A is twice as relevant to the search query as the result represented by tile 1B. In further embodiments, the size of tiles may not be directly proportional to relevance, but merely indicate that the tile having a larger area is more relevant than the one or more other tiles having smaller areas.

In subcategory 2, there are three exemplar tiles shown, 2A, 2B, 2C, each of the same size. This may indicate that the result represented by each of these tiles is equally relevant, or nearly equally relevant, to the search query. In one example, search results may be considered to be nearly equally relevant so as to have tiles of the same size, when a determined relevance for the two or more results are within 10% of each other. This percentage may be higher or lower in further embodiments.

Category 3 has a single exemplar tile 3. In embodiments, this means that the search results for tile 3 has been determined to have a relevance above the threshold, but no other results were above the predetermined threshold. It may alternatively mean that the relevancy score for the search results of tile 3 was significantly higher than all other search results in this category, even if the other search results were above the predetermined threshold.

Category 4 includes six search results, represented by exemplar tiles 4A-4F in this example. Tiles 4A and 4B are the same sizes, indicating that results represented by these tiles are of equal or nearly equal relevance to each other. Tiles 4C and 4D are the same sizes, indicating that results represented by these tiles are of equal or nearly equal relevance to each other. And tiles 4E and 4F are the same sizes, indicating that results represented by these tiles are of equal or nearly equal relevance to each other.

The tiles 4A and 4B are larger than the tiles 4C and 4D, which are in turn larger than the tiles 4E and 4F. This indicates that the results represented by tiles 4A and 4B are more relevant to the search query than the results represented by tiles 4C and 4D. The search results represented by tiles 4C and 4D are in turn more relevant than search results represented by tiles 4E and 4F.

The relative sizes of the tiles in the respective categories of the user interface 100 of FIG. 2 are by way of example only. It is understood that a wide variety of other tile-sizing schemes may be used where the size of the tile(s) within a category are used to indicate the relative importance of the one or more subcategories within the given category.

In embodiments, the relevance of search results and sizes of tiles may not be normalized across different categories. Thus, the search results represented by tile 1A may for example be more relevant than the search results represented by tile 3, but because tile 1B is also relevant, tile 1A is shown to be smaller than tile 3. In further embodiments, the size of the tiles may be normalized across all categories so that the size of tile may indicate its relevance as compared to other tiles within a category, and other tiles across other categories.

Figure 5:
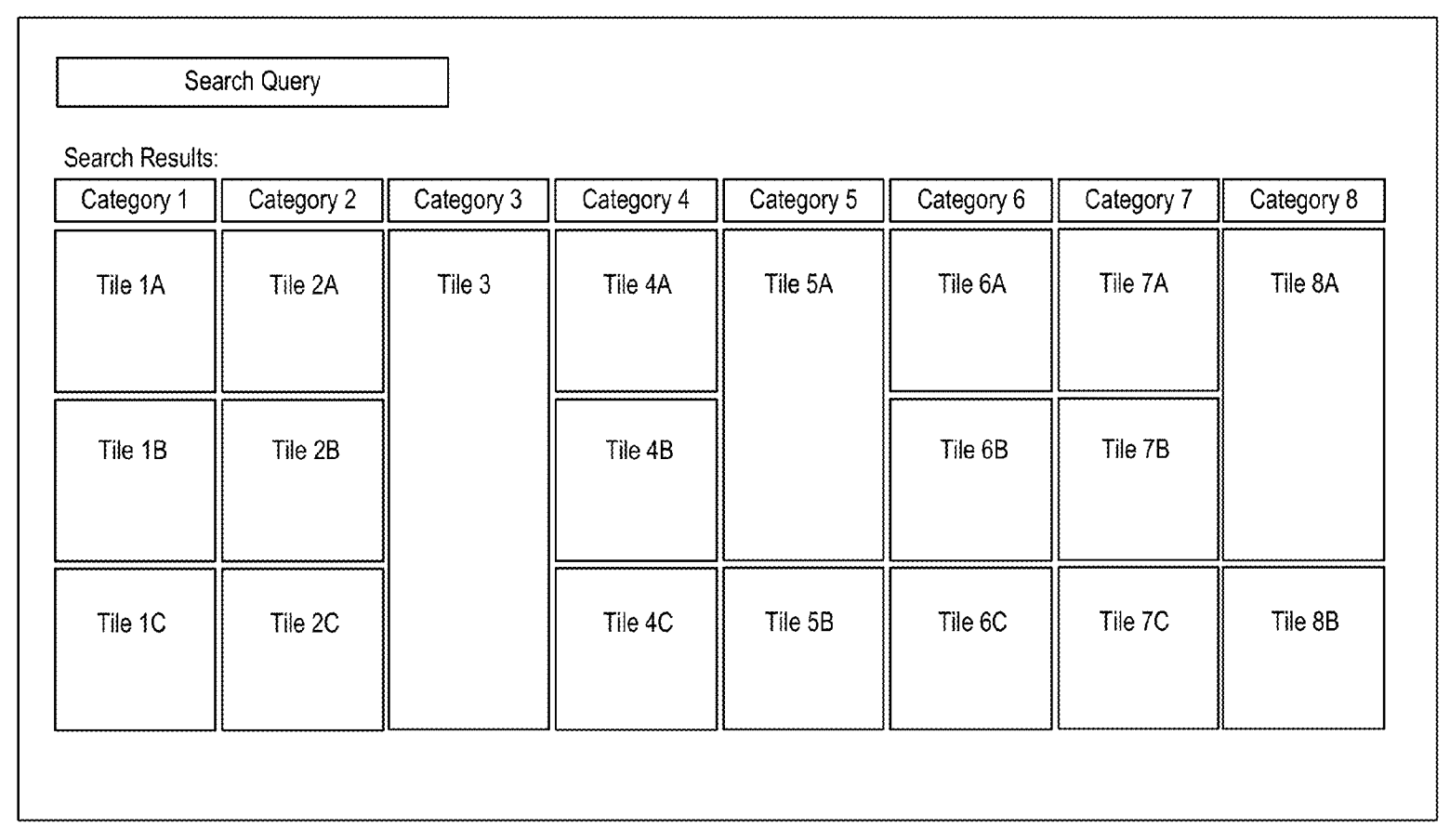

In addition to in-bucket relevancy, the present technology determines and visually indicates the relevance to the search query of the results in a given category relative to the other categories. This is referred to herein as cross-bucket relevancy. Cross-bucket relevancy is communicated by the size of category, such that very high confidence results within a single category enable the category to grow in width to display more results (e.g., double wide bucket). It is also conceivable that different categories be weighted differently. Thus, where a first category is weighted more than a second category, the results in the first category may be skewed to have a higher cross-bucket relevance, in a larger width, as compared to the results in the second category. FIGS. 3-5 illustrate cross-bucket relevancy.

In the example of FIG. 3, the column for category 1 (including the category 1 header and the exemplar tiles) is wider than the columns for categories 2 and 3. This indicates that at least one of the search results for category 1 is more relevant than the search results for categories 2 and 3. In embodiments, the relative sizes of the category columns may be directly proportional to the relative relevance of search results in the respective categories. Thus, as the column for category 1 is roughly twice the size of the columns for categories 2 and 3, this may mean that at least one search result in category 1 is twice as relevant to the search query as the results for categories 2 and 3. In further embodiments, the size of columns may not be directly proportional to relevance, but merely indicate that the column having a larger width is more relevant than the one or more other columns having a smaller widths.

The cross-bucket relevance of the respective categories may be determined a number of ways. In one example, historical click-through data may show that, for a given query, one or more categories were selected more often than other categories. The more-often selected category or categories may be displayed wider than the other categories. In a further embodiment, individual search results within a category may be looked at in setting the width of a column. Thus, if the search result represented by tile 1A is more relevant than any of the search results in categories 2 and 3, the width of category 1 may be larger.

In an alternative embodiment, the search result relevance of each of the displayed exemplar tiles may be combined to come up with a relevance of the category as a whole. More relevant categories may be given wider columns. In a still further embodiment, the relevance of all search results for a category (not just the exemplars) may be combined to come up with a relevance of the category as a whole. This relevance may then be used in setting column width relative to other category columns.

In the example of FIG. 3, width of the columns for categories 2 and 3 are the same. This may indicate that the results in categories 2 and 3 are equally relevant, or nearly equally relevant, to each other.

FIG. 4 illustrates an example illustrating cross-bucket relevance, where the width of a category column is determined by the number of displaying exemplar tiles. In this example, it may be that no single result in category 1 is more relevant than any result in category 2. However, as category 1 has seven exemplar search results, indicated by tiles 1A-1G, and category 2 has three exemplar search results, indicated by tiles 2A-2C, category 1 is displayed with a greater width than category 2. FIG. 5 illustrates an example where the search results for eight different categories 1-8 all have the same or nearly the same relevance as compared to each other.

The relative sizes of the columns for the respective categories of the user interface 100 of FIGS. 3-5 are by way of example only. It is understood that a wide variety of other category-sizing schemes may be used where the size of the categories are used to indicate the relative importance of the one or more categories relative to each other. In one such further embodiment, instead of categories being organized in columns, categories and the organized in rows. In such an embodiment, the vertical lengths of category rows may indicate relevance in relation to other categories.

Referring again to the flowchart of FIG. 1, once the search results are obtained, and prior to display of the results, the results are sorted into respective categories in step 206. Various categorizing algorithms may be used to identify search results from the query, identify categories/subcategories appropriate to the search results, and then group the search results within those categories/subcategories. Various relevance scoring algorithms may also be used to determine the relevance of search results, both to the search query and to the specific user, so as to layout categories/tiles as described above with respect to FIGS. 2-5. Examples of these categorizing algorithms and relevance scoring algorithms are described below.

Various search schemes, algorithms and databases may be used to perform the search. In one example, the search may be performed on one or more databases from which search results for all queries are taken. In such an embodiment, search results for a given query may be generated in a known manner, using for example historical data (e.g., search results returned in the past for the same or similar search queries) as well as key word searches (e.g., return search results having words or associated metadata matching one or more of the search terms). In embodiments, search results may be tailored to specific users, based on stored user profiles. As one example, a user's stored profile may indicate that the user is a motorcycle enthusiast. A search query for example including "bikes" may return results skewed toward motorcycles instead of bicycles. Search results may be customized for specific users in other ways in further embodiments.

In an embodiment where search results are retrieved from one or more databases, a cloud service administering the database(s) may tag all of the results in the database with metadata identifying one or more predefined categories to which the result belongs, and possibly one or more predefined subcategories to which the result also belongs. In such an embodiment, each search result may be stored with one or more predefined categories/subcategories into which the search result may be sorted. It is conceivable that a search result belong to more than one category. It is also conceivable that a search result may belong to a first category for a first search query, but belong to a second category for a second search query.

In further embodiments, the results may come from one or more databases where the results are not tagged with metadata identifying a category or subcategory. In such embodiments, the results may include metadata including additional information relating to the search result. This additional information may for example be a general subject matter description of the result, a title, a genre, related key words, phrases and synonyms for result terms, a date when the result was created and/or added to the database, topics related to the result, etc.

In this embodiment, upon identifying a search result for a given query, a categorizing algorithm may analyze the metadata, and determine a category/subcategory from a predefined list of categories/subcategories to which the result is assigned. The category/subcategory may also include metadata describing the category/subcategory, and the algorithm may look for semantic similarities. When such similarities are found above some predefined threshold, the result may be assigned to the matched category/subcategory.

In addition to, or instead of, analyzing metadata, the categorizing algorithm may look to historical data as to what, if any, predefined categories/subcategories the result was assigned to. If such historical data is found, it may be used in setting the category/subcategory. The categorizing algorithm may additionally or alternatively have access to stored profile data for a user, and tailor the categorization of a result based on the user's profile data. Accordingly, the search results for the same query performed by two different users may result in different categorizations of the search results. It is understood that other categorizing schemes and algorithms may be used for categorizing a search result.

In addition to categorizing search results, the present technology may further determine the relevance of a given search result for the entered query in step 210. This may be performed a variety of ways, using a variety of relevance scoring algorithms. In one embodiment, in addition to categorizing results in a given category, a cloud service may assign a search result different relevance values for different search queries. Historical data may also or alternatively be used. For example, data may be stored as to how many time a particular result was clicked on for a given search query. The more times a given result was clicked on for a given search query, the higher the relevance of that search result for that search query.

In further embodiments, a relevance scoring algorithm may determine a relevance by examining a variety of data including global data, query dependent data and user-specific data. Global data may include may include historical data relating to the popularity of a given search result. Search results relating to popular subject matter or people may get a bump in their relevance score as compared to less well known subject matter or people. This historical data may further relate to the temporal recency of a search result. Search results relating to topical or current subject matter may receive a bump in their relevance score as compared to search results that were more topical at a past time. Global data may further relate to the geographic location where the search is performed. Search results may receive a bump in their relevance score where the search result is tied or otherwise related to a geographic area where the search is performed.

The relevance scoring algorithm may also or alternatively use query-dependent data in determining relevance. In general, search results that are more similar to a search query, semantically and/or textually, will receive higher relevance score than less related search results. In determining semantic similarity, a relevance scoring algorithm may analyze metadata associated with a given search result and search query and establish a relevancy based on key word and semantic matches between the search query/search query metadata and the search result/search result metadata.

The relevance scoring algorithm may further employ user-specific data in determining relevance. For example, the scoring algorithm may give a bump in relevance score to search results which the user has clicked on and spent time reviewing. User profile information may also be used by the relevance scoring algorithm in determining the relevance of a search result to a given query. It is understood that other relevance scoring schemes and algorithms may be used for quantifying a relevance of a particular result for a particular search query.

Referring again to the flowchart of FIG. 1, it may happen that the search returns a small number of search results. In this event, the search results may be categorized as described above. However, the search results may alternatively be displayed in a conventional listing of the results in a ranked order. In step 212, the present system checks whether the number of results are less than some predetermined number of results, n. If so, the results may be displayed, in a ranked list without categories, on a user interface in step 216. In embodiments, n may be equal to 20 results, but it may be more or less than 20 results in further embodiments. It is also understood that a user may manually override the categorization features of the present technology so that search results are returned in a ranked list even when there are a large number of search results.

However, in embodiments, if there is a large number of results (at least n number of results or greater), the categories/subcategories to be displayed on the user interface 100 may be determined in step 220. In an embodiment, the categories and subcategories may be predetermined and fixed. In this instances, step 220 checks whether there are any search results that have been sorted into a given category/subcategory. If there is a search result for a given category having a relevance score above a predefined threshold, the category may be included on the user interface 100, and the search result may be displayed under that category in step 220. As noted below, a category may be selected, or pivoted on, to see subcategories for that category. If there is a search result for a given subcategory having a relevance score above a predefined threshold, the subcategory may be displayed, and the search result may be displayed under that subcategory when the category is pivoted on. If there are no results for a given category or subcategory, they may be omitted from the display.

In a further embodiments, the categories and subcategories may be dynamic, and chosen from a larger group of categories/subcategories based on the search results and, possibly, other factors such as stored user preferences, user input or context. Categories/subcategories may be selected to provide a good representation of the search results; that is, so that all the search results are reflected in at least one of the categories. For example, where the search results are heavily skewed into a subset of, for example, between two and eight categories, those categories may be selected for display in step 220. The same may be true for the subcategories under each selected category. The categories may also be heterogeneous groups that do not map to the same facet, thus providing diverse coverage across the categories. The same may be true for a group of subcategories. It is understood that there may be more than eight categories/subcategories selected in further embodiments. User profiles and expressed user preferences may also be used in selecting categories/subcategories.

In further embodiments, context may be factored in when selecting the categories or subcategories. As one of many examples, if a user and friends are playing a video game, and the game is part of a search query, then "friends playing" may be selected as a category or subcategory.

In further embodiments, the step 206 of categorizing results, and the step 220 of selecting categories/subcategories to display, may be integrated into a single step. In such an embodiment, the search results are analyzed, and then sorted into appropriate categories/subcategories which are then displayed. Various rules may be applied in sorting results into selected categories/subcategories. These rules may apply the metadata associated with the search query, the search results and categories. Alternatively or additionally, these rules may take into consideration global data, query dependent data and user-specific data, as these concepts are explained above.

As explained below, a distinction is made herein between searching and browsing. When browsing, a user is not looking for a specific result. Conversely, when searching, a user has a specific result they are looking for. When searching, search queries tend to be more specific and detailed. When a detailed search query is entered, the present technology may bypass the high level categories (such as are shown for example in FIG. 2), and possibly one or more levels of subcategories, and jump directly to a subcategory level which provides the results the user is interested in. As one of any number of examples, if a user searches for superhero movies, categories of "movies, music, games, television shows" may not be displayed, a user has indicated a specific interest in movies. Instead, relevant genres or subcategories under the movies category may be displayed. Similarly, if there is a single, highly confident result, this may be the only exemplar tile shown on the user interface 100.

Once the search results have been sorted and the categories/subcategories selected, the user interface 100 including the categorized search results may be displayed, as shown for example in any of FIGS. 2-5. As noted, the top (most relevant) results for each category may be displayed as exemplar tile(s) under the category. Specifically, each search result may have an associated stored graphics content data file for formatting a software tile template. Once a search result is determined to be an exemplar result, the tile is sized based on other results for that category as explained above, and the software template for that tile is then populated using the data from the graphics content data file associated with the exemplar result.

As noted, a category may have more results than are shown by the exemplar tiles under the result. In embodiments, a number (indicated by "##" in FIG. 2) may be displayed in the category heading to indicate how many results there are for each displayed category. These additional results may be viewed by pivoting on the category or subcategory heading.

Figure 7:
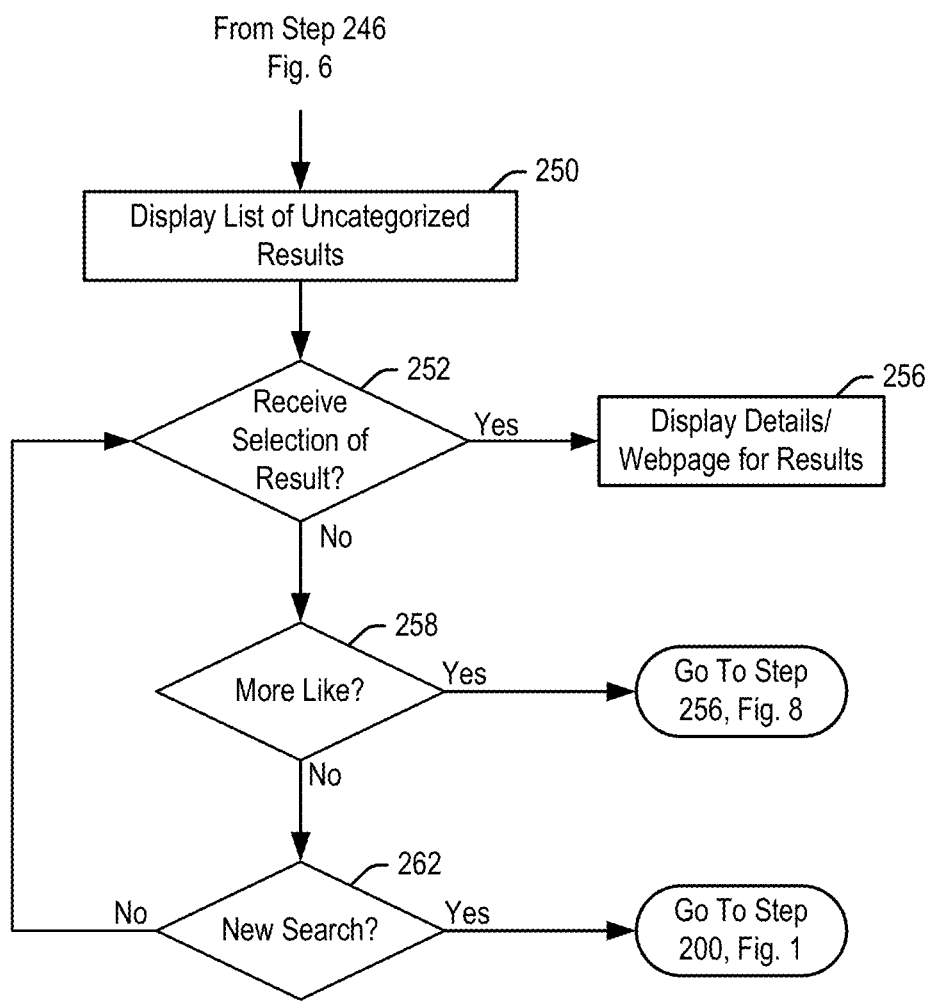
Figure 8:
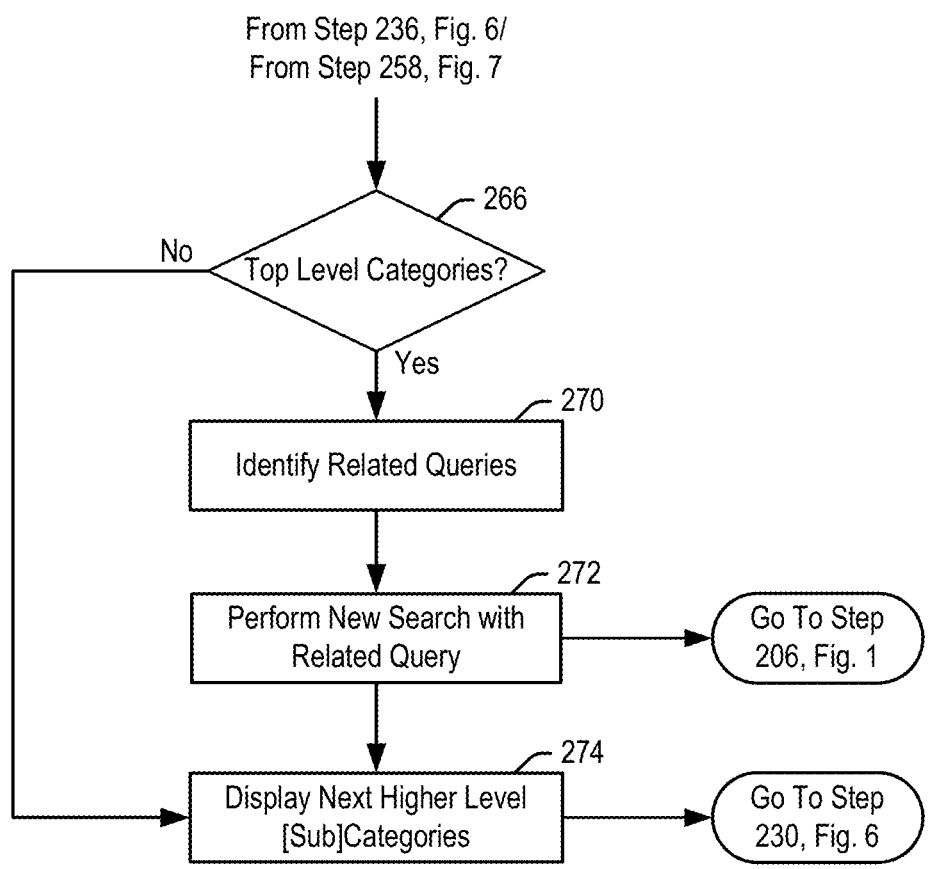

Once user interface 100 is displayed, a user may interact with interface 100 as will now be explained with reference to the flowcharts of FIGS. 6-8. In step 230, the present system looks for selection of an exemplar tile under one of the displayed categories. As noted, the exemplar tiles are selected because they are determined to represent the search results most likely to be of interest to the user. If an exemplar tile selected, the user interface may display detailed information for the selected result. This detailed information may for example be a website to which the exemplar tile points.

In embodiments, one of the categories listed may be a "more like" category. This may be presented as the last category (farthest to the right) on user interface 100 though it may be at other locations in further embodiments. Subcategories may similarly include a "more like" topic heading. As explained below, the present technology allows users to easily drill down into categories and subcategories to get the more detailed results. However, selection of the "more like" category performs the opposite function of broadening out the search and/or results to additional subject matter.

In step 236, the present system looks for selection of the "more like" heading. As explained below, step 236 may be selected while a user is viewing top-level categories, or subcategories beneath the top-level categories. Referring now to step 266 in the flowchart of FIG. 8, upon selection of the "more like" heading, the present system first determines whether a user is viewing the top-level categories or subcategories within the high level categories. If the user selects the "more like" heading at the top-level categories, this is interpreted as a user wishing to broaden the search results by performing a new search on one or more queries related to the initial, root query. In embodiments, these related queries may be semantically related to the root query, and for example identified from historical data showing a similarity in search results between the related queries and the root query.

A user may identify a selected related query, and a new search may be performed by the search engine on the related query in step 272. Thereafter, the flow returns to step 206 (FIG. 1), where the present system categorizes and scores the search results for the related query and displays the categorized results together with exemplar tiles for the identified categories.

On the other hand, if it is determined in step 266 that the user is not viewing top-level categories, but is instead viewing a subcategory, the present system may return to the next higher level and display the categories/subcategories of the next higher level together with the exemplar tiles.

Figure 6:
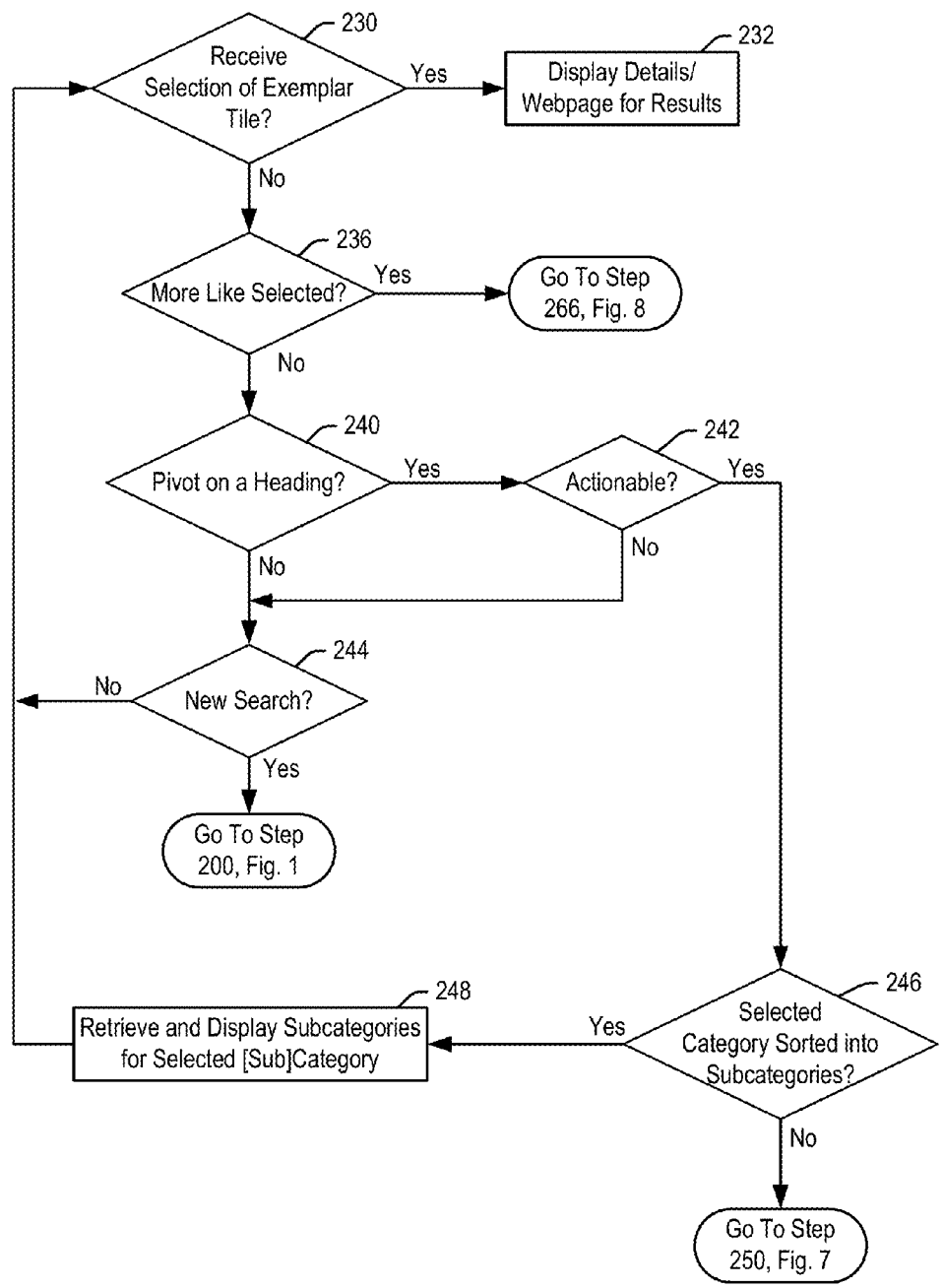
FIGS. 6-8 are flowcharts illustrating interaction with the user interface including categorized search results according to embodiments of the present technology.

Returning again to the flowchart of FIG. 6, if the "more like" heading is not selected in step 236, the present system looks in step 240 whether a user has pivoted on a heading. In particular, the tiles displaying the category or subcategory names may themselves be hyperlinks. When a category or subcategory heading is selected, the present system may present a new screen having a new level of subcategories each relating in some way to the next higher level category/subcategory. This focuses the user toward the specific search results the user is searching for without the user having to scroll through multiple screens. As noted, it is conceivable that search results for a given query been broken down into categories, subcategories, sub-subcategories, sub-sub-categories, etc., depending for example on the number of search results that were generated by the search query.

The subcategories selected for a given category/subcategory may be predefined subtopics relating to the next higher level category/subcategory. Alternatively, subcategories for a given category/subcategory may be dynamically selected from a larger group of subcategories specifically defined for the next higher level category/subcategory. In embodiments, the subcategories (as well as the high-level categories) may be defined to broadly encompass the search results contained within the next higher level category/subcategory. Specific subcategories may be defined for a given categories/subcategories. For example, the categories of movies and television may have different genres as subcategories, such as for example comedies, popular, mysteries, award winners, and new releases. This is one example of any number of examples which are possible.

If no category/subcategory is pivoted on in step 240, the present system may examine whether the user has entered a new search query. If a new search query is detected, the present system returns to step 200 (FIG. 1) to perform the new search and present the categorized results. If not, the flow returns to step 230 to await selection of either an exemplar tile, a topic heading or a new search query.

On the other hand, if a category or subcategory heading is pivoted on in step 240, the present system checks in step 242 whether there are in fact additional results for the selected category/subcategory. If not, the selected category/subcategory will not be actionable in step 242. Alternatively, if the selected category/subcategory is actionable (indicating there are additional results), the present system checks in step 246 whether the additional results are broken down into subcategories, or whether the additional results are sufficiently few that they may simply be listed in a ranked order. If there are subcategories in step 246, the present system retrieves and displays the subcategories for the selected category/subcategory in step 248. Thereafter, the flow returns to step 230, where the present system looks for selection of an exemplar tile or subcategory heading.

On the other hand, if the additional results in step 246 are few enough so as not to be categorized, the present system performs a step 250 (FIG. 7) of displaying the ranked list of uncategorized results. In step 252, the present system looks for selection of one of the ranked results. If a result is selected, the present system displays those results in detail in step 256.

If none of the ranked results are selected, the present system looks in step 258 for selection of a "more like" option, which may be presented as a graphical button on the user interface alongside the ranked results. If the "more like" option is selected, the system may return to the next higher level in step 256 (FIG. 8) as described above. If the "more like" option is not selected, the present system may look for a new search query in step 262. If found, the present system returns to step 200 (FIG. 1) to perform a new search and present the newly categorized results. If no new search is detected in step 262, the flow returns to step 252 to look for either selection of a ranked result, the "more like" option or a new search.

User interface 100 as described above provides the advantage of the search results being graphically displayed in fixed viewport, without the need to scroll to see a large list of the results. This static user view allows users to easily select categories and subcategories, and to drill down to specific results, either verbally or with the user interface selection device, such as a mouse or touchscreen. Moreover, the results are intelligently and intuitively categorized to make the search process easier and faster for users. A user does not need to wade through a long list of results. The results are organized so that a user is able to quickly locate relevant results and drill down into quickly recognizable areas of interest.

In general, there may be considered two different search modes. A first mode is referred to herein as browsing. In this mode, the user does not have a specific idea of what they are looking for, but is looking to the research results to guide them to where they want to go. Organization of the search results into broad categories, which can be drilled down into at desired points, allows users to browse results much more quickly, easily and intuitively. A second mode is referred to herein as searching. In this mode, a user has a specific idea of what they are looking for, and is able to enter a detailed search query. When a detailed search query is presented, the present technology is able to bypass the high level categories, and possibly one or more levels of subcategories, and jump directly to a subcategory level which provides the results the user is interested in.

Interaction with the user interface 100 may be performed by a user either using speech commands or using a selection device such as a mouse or touch screen. Organization of the search results into categories and subcategories optimizes the search results for review using both speech commands and selection devices. With speech commands, a user may select a category/subcategory by speaking its heading. A user may alternatively speak the title of an exemplar tile to access the detailed information for that exemplar tile.

Figure 9:
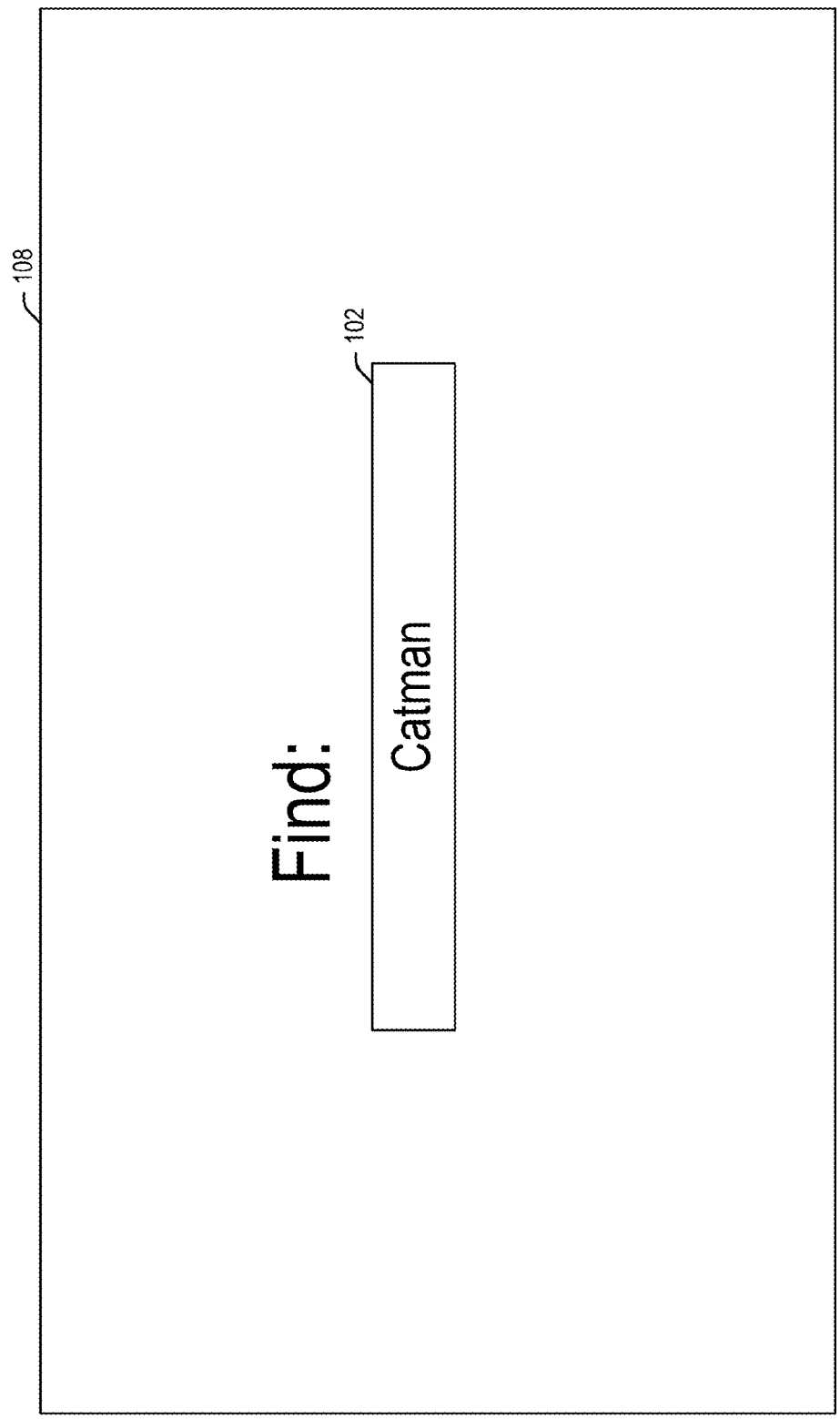

An exemplary implementation of the present system will now be described with reference to the user interfaces 100 shown on FIGS. 9-11. In this exemplary implementation, the search, categories/subcategories and results are in the media and entertainment field. However, as noted above, the searches, categories/subcategories and results could relate to any subject matter. FIG. 9 illustrates a search engine user interface 108 where the user wishes to perform a search on "Catman." For the purposes of this example, Catman is assumed to be a fictitious pop-culture character, such as for example a superhero, who is been the subject in various entertainment mediums such as movies, television shows and comic books.

FIG. 10 illustrates a user interface 100 where the search results for Catman have been sorted under the categories 110, which in this example are movies, television, comics, popular and More Like. Exemplar tiles 112 are presented under each category 110, showing the most relevant results for each category. As discussed above, a tile may have graphics and additional information (not shown) relating to the search result. As also discussed above, the size of the exemplar tiles 112 within each category may indicate in-bucket relevance, and the width of the respective category columns may indicate cross-bucket relevance. The last column, "more like," presents further additional possible search queries which are semantically related to the Catman query.

It may happen that a given search result is categorized into multiple different categories/subcategories. In embodiments, at least for the exemplar tiles, duplicate results are removed so that the same search result does not show up under two separate categories. Duplicates may be allowed in further embodiments.

In FIG. 11, the user has pivoted on the movie heading, and subcategories related to Catman movies are displayed in subcategories 114. These subcategories 114 in this example are genres of Catman movies, including suspenseful, funny and scary movies. Exemplar tiles 112 are presented under each subcategory 114, showing the most relevant results for each subcategory. As discussed above, a tile may have graphics and additional information (not shown) relating to the search result. As also discussed above, the size of the exemplar tiles 112 within each subcategory may indicate in-bucket relevance, and the width of the respective subcategory columns may indicate cross-bucket relevance. The last column, "more like," presents the higher-level categories to broaden out the search. As noted above, it is conceivable that one or more of the subcategories 114 are themselves actionable. If actionable, further subcategories (sub-subcategories) may be presented for a given subcategory 114 shown on FIG. 11.

Figure 12:
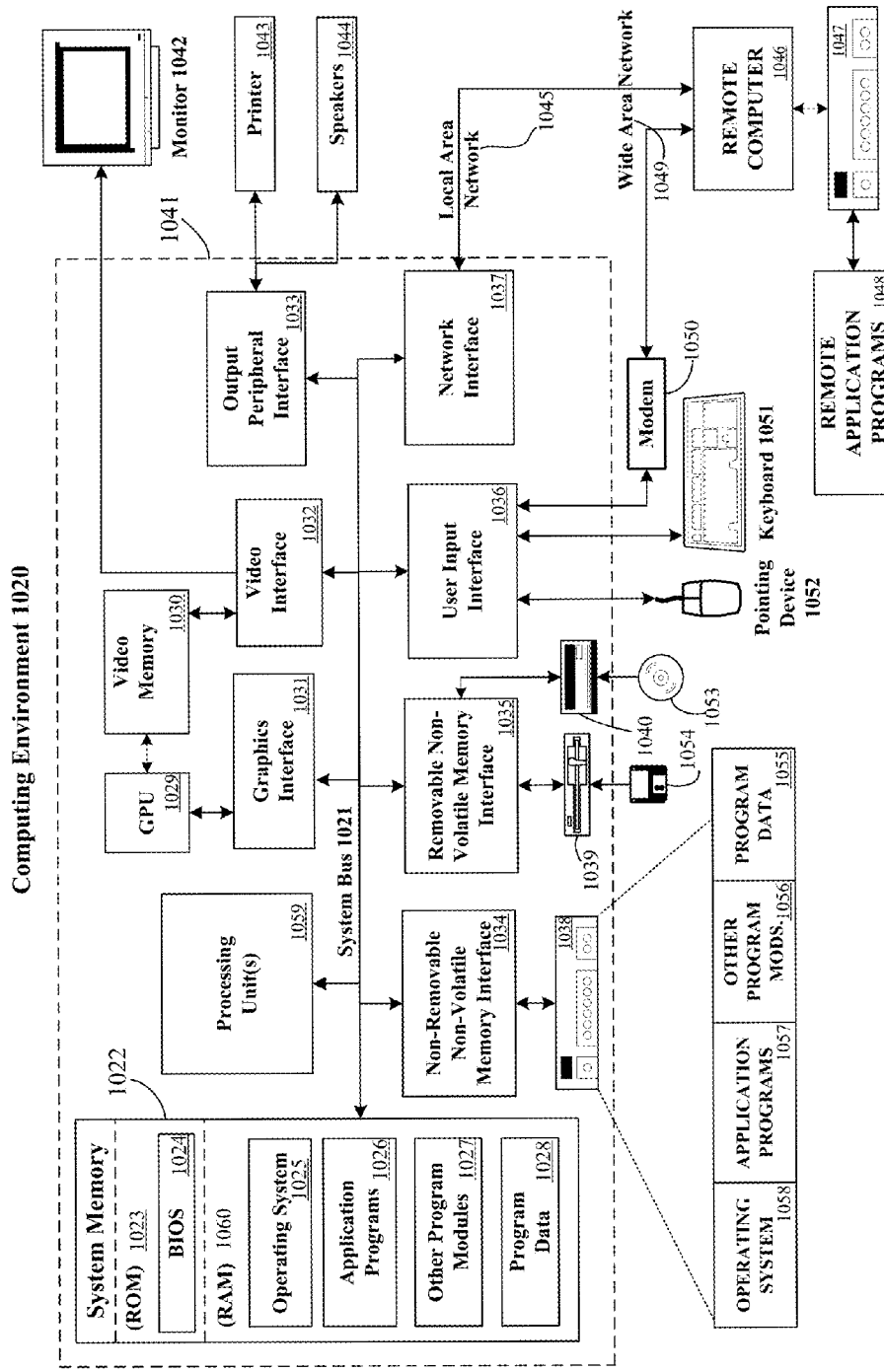
FIG. 12 is a block diagram illustrating components of an exemplary computing system for implementing aspects of the present technology.

FIG. 12 illustrates an example implementation of a computing environment 1020 which may implement a search according to the present technology. The computing system environment 1020 is only one example of a suitable computing environment and is not intended to suggest any limitation as to the scope of use or functionality of the presently disclosed subject matter. Neither should the computing environment 1020 be interpreted as having any dependency or requirement relating to any one or combination of devices illustrated in the example operating environment 1020. In some implementations, the various depicted computing elements may include circuitry configured to instantiate specific aspects of the present disclosure. For example, the term circuitry used in the disclosure can include specialized hardware devices configured to perform function(s) by firmware or switches. In other example implementations, the term circuitry can include a general purpose processing unit, memory, etc., configured by software instructions that embody logic operable to perform function(s). In example implementations where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

In FIG. 12, the computing environment 1020 comprises a computer 1041, which typically includes a variety of computer-readable storage media. Computer-readable storage media can be any available media that can be accessed by computer 1041 and includes both volatile and nonvolatile media, removable and non-removable media. The system memory 1022 includes computer storage media in the form of volatile and/or nonvolatile memory such as ROM 1023 and RAM 1060. A basic input/output system 1024 (BIOS), containing the basic routines that help to transfer information between elements within computer 1041, such as during start-up, is typically stored in ROM 1023. RAM 1060 typically contains data and/or program modules that are immediately accessible to and/or presently being operated on by processing unit 1059. By way of example, and not limitation, FIG. 12 illustrates operating system 1025, application programs 1026, other program modules 1027, and program data 1028. FIG. 12 further includes a graphics processor unit (GPU) 1029 having an associated video memory 1030 for high speed and high resolution graphics processing and storage. The GPU 1029 may be connected to the system bus 1021 through a graphics interface 1031.

The computer 1041 may also include other removable/non-removable, volatile/nonvolatile computer storage media. By way of example only, FIG. 12 illustrates a hard disk drive 1038 that reads from or writes to non-removable, nonvolatile magnetic media, a magnetic disk drive 1039 that reads from or writes to a removable, nonvolatile magnetic disk 1054, and an optical disk drive 1040 that reads from or writes to a removable, nonvolatile optical disk 1053 such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 1038 is typically connected to the system bus 1021 through a non-removable memory interface such as interface 1034, and magnetic disk drive 1039 and optical disk drive 1040 are typically connected to the system bus 1021 by a removable memory interface, such as interface 1035.

The computer 1041 may include a variety of computer readable media. Computer readable media can be any available tangible media that can be accessed by console 500 and includes both volatile and nonvolatile media, removable and non-removable media. As used herein, a computer readable medium and computer readable media do not include transitory, transmitted or other modulated data signals that are not contained in a tangible media.

The drives and their associated computer storage media discussed above and illustrated in FIG. 12, provide storage of computer readable instructions, data structures, program modules and other data for the computer 1041. In FIG. 12, for example, hard disk drive 1038 is illustrated as storing operating system 1058, application programs 1057, other program modules 1056, and program data 1055. Note that these devices can either be the same as or different from operating system 1025, application programs 1026, other program modules 1027, and program data 1028. Operating system 1058, application programs 1057, other program modules 1056, and program data 1055 are given different numbers here to illustrate that, at a minimum, they are different copies. A user may enter commands and information into the computer 1041 through input devices such as a keyboard 1051 and a pointing device 1052, commonly referred to as a mouse, trackball or touch pad. Other input devices (not shown) may include a microphone, joystick, game pad, satellite dish, scanner, or the like. These and other input devices are often connected to the processing unit 1059 through a user input interface 1036 that is coupled to the system bus, but may be connected by other interface and bus structures, such as a parallel port, game port or a universal serial bus (USB). The cameras 26, 28 and capture device 10 may define additional input devices for the console 1000. A monitor 1042 or other type of display device is also connected to the system bus 1021 via an interface, such as a video interface 1032. In addition to the monitor, computers may also include other peripheral output devices such as speakers 1044 and printer 1043, which may be connected through an output peripheral interface 1033.

The computer 1041 may operate in a networked environment using logical connections to one or more remote computers, such as a remote computer 1046. The remote computer 1046 may be a personal computer, a server, a router, a network PC, a peer device or other common network node, and typically includes many or all of the elements described above relative to the computer 1041, although a memory storage device 1047 alone has been illustrated in FIG. 12. The logical connections depicted in FIG. 12 include a local area network (LAN) 1045 and a wide area network (WAN) 1049, but may also include other networks. Such networking environments are commonplace in offices, enterprise-wide computer networks, intranets and the Internet.

When used in a LAN networking environment, the computer 1041 is connected to the LAN 1045 through a network interface or adapter 1037. When used in a WAN networking environment, the computer 1041 typically includes a modem 1050 or other means for establishing communications over the WAN 1049, such as the Internet. The modem 1050, which may be internal or external, may be connected to the system bus 1021 via the user input interface 1036, or other appropriate mechanism. In a networked environment, program modules depicted relative to the computer 1041, or portions thereof, may be stored in the remote memory storage device. By way of example, and not limitation, FIG. 12 illustrates remote application programs 1048 as residing on memory device 1047. It will be appreciated that the network connections shown are example and other means of establishing a communications link between the computers may be used.

Figure 13:
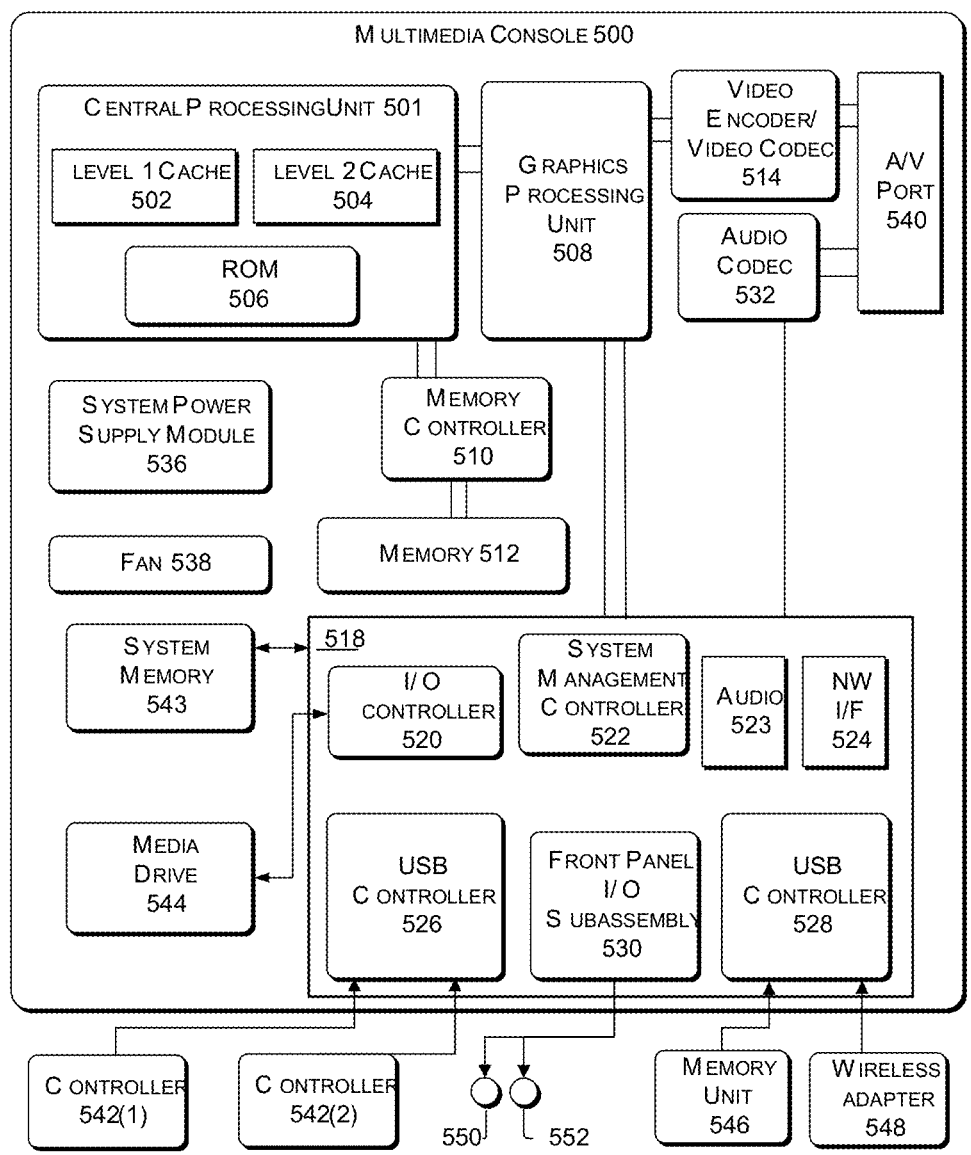
FIG. 13 is a block diagram illustrating components of an exemplary gaming system for implementing aspects of the present technology.

The present technology may be implemented from a gaming or other multimedia console. FIG. 13 illustrates an example embodiment of a computing system in the form of a multimedia console that may be used to implement the present technology. As shown in FIG. 13, the multimedia console 500 has a central processing unit (CPU) 501 having a level 1 cache 502, a level 2 cache 504, and a flash ROM (Read Only Memory) 506. The level 1 cache 502 and a level 2 cache 504 temporarily store data and hence reduce the number of memory access cycles, thereby improving processing speed and throughput. CPU 501 may be provided having more than one core, and thus, additional level 1 and level 2 caches 502 and 504. The flash ROM 506 may store executable code that is loaded during an initial phase of a boot process when the multimedia console 500 is powered on.

A graphics processing unit (GPU) 508 and a video encoder/video codec (coder/decoder) 514 form a video processing pipeline for high speed and high resolution graphics processing. Data is carried from the graphics processing unit 508 to the video encoder/video codec 514 via a bus. The video processing pipeline outputs data to an A/V (audio/video) port 540 for transmission to a television or other display. A memory controller 510 is connected to the GPU 508 to facilitate processor access to various types of memory 512, such as, but not limited to, a RAM (Random Access Memory).

The multimedia console 500 includes an I/O controller 520, a system management controller 522, an audio processing unit 523, a network interface 524, a first USB host controller 526, a second USB controller 528 and a front panel I/O subassembly 530 that are preferably implemented on a module 518. The USB controllers 526 and 528 serve as hosts for peripheral controllers 542(1)-542(2), a wireless adapter 548, and an external memory device 546 (e.g., flash memory, external CD/DVD ROM drive, removable media, etc.). The network interface 524 and/or wireless adapter 548 provide access to a network (e.g., the Internet, home network, etc.) and may be any of a wide variety of various wired or wireless adapter components including an Ethernet card, a modem, a Bluetooth module, a cable modem, and the like.

System memory 543 is provided to store application data that is loaded during the boot process. A media drive 544 is provided and may comprise a DVD/CD drive, Blu-Ray drive, hard disk drive, or other removable media drive, etc. The media drive 544 may be internal or external to the multimedia console 500. Application data may be accessed via the media drive 544 for execution, playback, etc. by the multimedia console 500. The media drive 544 is connected to the I/O controller 520 via a bus, such as a Serial ATA bus or other high speed connection (e.g., IEEE 1394).

The system management controller 522 provides a variety of service functions related to assuring availability of the multimedia console 500. The audio processing unit 523 and an audio codec 532 form a corresponding audio processing pipeline with high fidelity and stereo processing. Audio data is carried between the audio processing unit 523 and the audio codec 532 via a communication link. The audio processing pipeline outputs data to the A/V port 540 for reproduction by an external audio user or device having audio capabilities.

The front panel I/O subassembly 530 supports the functionality of the power button 550 and the eject button 552, as well as any LEDs (light emitting diodes) or other indicators exposed on the outer surface of the multimedia console 500. A system power supply module 536 provides power to the components of the multimedia console 500. A fan 538 cools the circuitry within the multimedia console 500.

The CPU 501, GPU 508, memory controller 510, and various other components within the multimedia console 500 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 500 is powered on, application data may be loaded from the system memory 543 into memory 512 and/or caches 502, 504 and executed on the CPU 501. The application may present a graphical user interface that provides a consistent user experience when navigating to different media types available on the multimedia console 500. In operation, applications and/or other media contained within the media drive 544 may be launched or played from the media drive 544 to provide additional functionalities to the multimedia console 500.

The multimedia console 500 may be operated as a standalone system by simply connecting the system to a television or other display. In this standalone mode, the multimedia console 500 allows one or more users to interact with the system, watch movies, or listen to music. However, with the integration of broadband connectivity made available through the network interface 524 or the wireless adapter 548, the multimedia console 500 may further be operated as a participant in a larger network community.

Optional input devices (e.g., controllers 542(1) and 542(2)) are shared by gaming applications and system applications. The input devices are not reserved resources, but are to be switched between system applications and the gaming application such that each will have a focus of the device. The application manager preferably controls the switching of input stream, without knowing the gaming application's knowledge and a driver maintains state information regarding focus switches. Capture device 20 may define additional input devices for the console 500 via USB controller 526 or other interface. In other embodiments, hub computing system 12 can be implemented using other hardware architectures. No one hardware architecture is required.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the invention be defined by the claims appended hereto.

We claim:

1. A method of presenting search results for a search query, comprising:
 (a) organizing the search results for the search query into two or more semantically unrelated categories, the search results organized into the two or more categories based on a semantic relation between the search results for the search query and the two or more categories; and (b) displaying the two or more categories, and at least one exemplar search result under a category of the two or more categories, on a single screen, the displayed exemplar search result determined to be most relevant under the category.

2. The method of claim 1, wherein said step (a) of organizing the search results into two or more categories comprises the step of using predefined categories.

3. The method of claim 1, wherein said step (a) of organizing the search results into two or more categories comprises the step of dynamically choosing the two or more categories depending on the makeup of the search results.

4. The method of claim 3, wherein said step (a) of organizing the search results into two or more categories comprises the step of dynamically choosing the two or more categories depending on at least one of stored preferences of a user performing the search, input from the user performing the search and context.

5. The method of claim 3, wherein said step (a) of dynamically choosing the two or more categories is performed by a cloud-based service.

6. The method of claim 1, wherein said step (b) of displaying at least one exemplar result for the category comprises the step of scoring the search results for relevance and displaying the at least one exemplar search result having a score above a predetermined threshold.

7. The method of claim 1, wherein said step (b) of displaying at least one exemplar result for the category comprises the step of displaying at least one exemplar tile representing a search result.

8. The method of claim 7, further comprising the step of formatting the at least one exemplar tile with graphics and text relating to the search result.

9. The method of claim 7, further comprising the step of formatting an exemplar tile of the at least one exemplar tiles as a selectable link, selection of the exemplar tile presenting additional information regarding the search result represented by the exemplar tile.

10. A method of presenting search results for a search query, comprising:

(a) organizing the search results into two or more categories, and two or more subcategories under a first category of the two or more categories, the search results organized into the two or more categories based on a semantic relation between the search results and the two or more categories, and search results organized into the two or more subcategories based on a semantic relation between the search results and the two or more subcategories;

(b) displaying the two or more categories, and at least a first exemplar search result under a category of the two or more categories, on a first screen, the first exemplar search result being relevant to the category and displayed in a graphical tile associated with the category;

(c) receiving selection of the first category of the two or more categories; and (d) displaying the two or more subcategories of the first category, and at least a second exemplar search result under a subcategory of the two or more categories, on a second screen, the at least second exemplar search result being relevant to the subcategory and displayed in a graphical tile in the subcategory.

11. The method of claim 10, further comprising the steps of receiving selection of a second category of the at least two categories, and displaying search results organized into the second category in a ranked list of search results.

12. The method of claim 10, further comprising the step of organizing the search results for a subcategory of the two or more subcategories into two or more sub-subcategories.

13. The method of claim 12, further comprising the steps of receiving selection of the subcategory of the two or more subcategories, and displaying the two or more sub-subcategories of the subcategory, and at least a third exemplar search result under a sub-subcategory of the two or more sub-subcategories, on a third screen.

14. The method of claim 10, wherein said step (a) of organizing the search results into two or more categories comprises the step of dynamically choosing the two or more categories depending on at least one of the makeup of the search results, stored preferences of a user performing the search, input from the user performing the search and a context of the search query.

15. The method of claim 10, wherein said step (b) of displaying at least a first exemplar result for the category comprises the step of scoring the search results for relevance and displaying the at least first exemplar tile for the at least one search result having a score above a predetermined threshold.

16. A computer-readable medium for programming a processor to perform a method of presenting search results for a search query, comprising:

(a) organizing the search results into first and second categories, the search results organized into the first and second categories based on a semantic relation between the search results and the two or more categories; and (b) displaying the first and second categories, displaying a first exemplar tile for a search result under the first category, and displaying a second exemplar tile for a search result under the second category, the first and second categories and first and second exemplar tiles displayed on a single screen, a dimension of the first displayed category sized relative to a like dimension of the second displayed category to indicate a relevance of the first category to the search query relative to a relevance of the second category to the search query.

17. The computer readable medium of claim 16, a plurality of search results being categorized under the first category, search results under the first category having a determined relevance score over a predefined threshold displayed as exemplar tiles with the first exemplar tile on the screen under the first category.

18. The computer readable media recited in claim 17, wherein a third exemplar tile is displayed with the first exemplar tile under the first category, a size of the first exemplar tile relative to the third exemplar tile indicating a relevance of the search result represented by the first exemplar relative to a relevance of the search result represented by the third exemplar.

19. The computer readable media of claim 16, wherein said step (a) of organizing the search results into first and second categories comprises the step of organizing the search as an optimization for voice interaction with search results, wherein a user engages search results by speaking the first or second category names or speaking a title of one of the first and second exemplar tiles.

20. A method of presenting search results for a search query, comprising:

(a) organizing the search results into at least first and second categories, the search results organized into the first and second categories based on a semantic relation between the search results and the two or more categories, the first and second categories displayed on a single screen; and (b) displaying at least a first search result in a first graphical tile in the first category, and at least a second search result in a second graphical tile in the first category, a dimension of the first graphical tile sized relative to a like dimension of the second graphical tile to indicate a relevance of the first search result to the search query relative to a relevance of the second search result to the search query.

21. The computer readable medium of claim 20, a plurality of search results being categorized under the first category, search results under the first category having a determined relevance score over a predefined threshold displayed as exemplar tiles with the first exemplar tile on the screen under the first category.

22. The computer readable media of claim 20, wherein said step (a) of organizing the search results into first and second categories comprises the step of organizing the search as an optimization for voice interaction with search results, wherein a user engages search results by speaking the first or second category names or speaking a title of one of the first and second exemplar tiles.

* * * * *